United States Patent
White et al.

(10) Patent No.: US 7,803,711 B2
(45) Date of Patent: Sep. 28, 2010

(54) LOW PH BARRIER SLURRY BASED ON TITANIUM DIOXIDE

(75) Inventors: Daniela White, Oswego, IL (US); John C. Parker, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 621 days.

(21) Appl. No.: 11/856,790

(22) Filed: Sep. 18, 2007

(65) Prior Publication Data

US 2009/0075566 A1    Mar. 19, 2009

(51) Int. Cl.
*H01L 21/302* (2006.01)
*H01L 21/461* (2006.01)

(52) U.S. Cl. .................. 438/690; 438/691; 438/692; 438/693

(58) Field of Classification Search ............... None
See application file for complete search history.

(56) References Cited

U.S. PATENT DOCUMENTS

| | | | |
|---|---|---|---|
| 4,241,042 A | 12/1980 | Matijevic et al. | |
| 4,579,751 A * | 4/1986 | Forster | 427/595 |
| 4,842,832 A | 6/1989 | Inoue et al. | |
| 6,152,976 A | 11/2000 | Ishitobi et al. | |
| 6,478,837 B1 | 11/2002 | Miyata | |
| 6,527,622 B1 | 3/2003 | Brusic et al. | |
| 6,589,100 B2 | 7/2003 | Moeggenborg et al. | |
| 6,824,579 B2 | 11/2004 | Ronay | |
| 6,830,503 B1 | 12/2004 | Grumbine | |
| 6,852,632 B2 | 2/2005 | Wang et al. | |
| 6,855,266 B1 | 2/2005 | Wang et al. | |
| 6,863,592 B2 | 3/2005 | Lee et al. | |
| 6,867,140 B2 | 3/2005 | Wang et al. | |
| 6,869,336 B1 | 3/2005 | Hardikar | |
| 6,887,137 B2 | 5/2005 | Lee et al. | |
| 6,964,923 B1 | 11/2005 | Ronay | |
| 7,071,108 B2 | 7/2006 | Matsui et al. | |
| 7,161,247 B2 | 1/2007 | De Rege Thesauro et al. | |
| 7,265,055 B2 | 9/2007 | Thompson et al. | |
| 2003/0166381 A1 | 9/2003 | Lee et al. | |
| 2004/0077295 A1 | 4/2004 | Hellring et al. | |
| 2005/0148186 A1 | 7/2005 | Jung et al. | |
| 2006/0024967 A1 | 2/2006 | De Rege Thesauro et al. | |
| 2006/0099814 A1 | 5/2006 | Carter et al. | |
| 2006/0108326 A1 | 5/2006 | Dysard et al. | |
| 2006/0141790 A1 | 6/2006 | Kim et al. | |
| 2008/0038995 A1 * | 2/2008 | Small et al. | 451/37 |
| 2009/0035942 A1 * | 2/2009 | White et al. | 438/692 |

OTHER PUBLICATIONS

Giamello et al., *Materials Chemistry and Physics*, 29: 379-386 (1991).
Lee et al., *Applied Surface Science*, 228: 410-417 (2004).
Liang et al., *Trans. Nonferrous Met. Soc. China*, 16: s426-s430 (2006).
Morandin et al., *Journal of Catalysis*, 212: 193-200 (2002).
Wilska, *Acta Chemica Scandinavica*, 8(10): 1796-1801 (1954).

* cited by examiner

*Primary Examiner*—Duy-Vu N Deo
(74) *Attorney, Agent, or Firm*—Thomas E. Omholt; Francis J. Koszyk; Steven D. Weseman

(57) ABSTRACT

The invention provides a method of chemically-mechanically polishing a substrate. A substrate is contacted with a polishing pad and a polishing composition comprising an abrasive consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å, and water. The polishing component is moved relative to the substrate, and at least a portion of the substrate is abraded to polish the substrate.

23 Claims, No Drawings

LOW PH BARRIER SLURRY BASED ON TITANIUM DIOXIDE

BACKGROUND OF THE INVENTION

Compositions and methods for planarizing or polishing the surface of a substrate, especially for chemical-mechanical polishing (CMP), are well known in the art. Polishing compositions (also known as polishing slurries) used in CMP processes typically contain an abrasive material in an aqueous solution. Typical abrasive materials include aluminum oxide, cerium oxide, silicon dioxide, and zirconium oxide. The polishing composition generally is used in conjunction with a polishing pad (e.g., polishing cloth or disk), which is saturated with the polishing composition and contacts the surface of the substrate. The polishing pad may contain abrasive material in addition to, or instead of, the abrasive material in the polishing composition.

Polishing compositions for silicon dioxide-based intermetal dielectric layers have been particularly well developed in the semiconductor industry, and the chemical and mechanical nature of polishing and wear of the silicon dioxide-based dielectrics is reasonably well understood. One problem with the silicon dioxide-based dielectric materials, however, is that their dielectric constant is relatively high, being approximately 3.9 or higher, depending on factors such as residual moisture content. As a result, the capacitance between the conductive layers is also relatively high, which in turn limits the speed (frequency) at which a circuit can operate. Strategies being developed to increase the frequency at which the circuit can operate include (1) incorporating metals with lower resistivity values (e.g., copper), and (2) providing electrical isolation with insulating materials having lower dielectric constants relative to silicon dioxide.

One way to fabricate planar copper circuit traces on a dielectric substrate is referred to as the damascene process. In accordance with this process, the silicon dioxide dielectric surface is patterned by a conventional dry etch process to form holes (i.e., vias) and trenches for vertical and horizontal interconnects prior to deposition of copper onto the surface. Copper has the property of being a fast diffuser and can move quickly through the underlying dielectric layer to "poison" the device. Thus, a diffusion barrier layer is typically applied to the substrate before deposition of copper. The diffusion barrier layer is provided with a copper seed layer and then over-coated with a copper layer from a copper plating bath. Chemical-mechanical polishing is employed to reduce the thickness of the copper over-layer, as well as the thickness of the diffusion barrier layer, until a planar surface that exposes elevated portions of the dielectric surface is obtained. The vias and trenches remain filled with electrically conductive copper forming the circuit interconnects.

Tantalum and tantalum nitride have found wide acceptance in the industry as barrier layer materials and typically are applied to a substrate by physical vapor deposition (PVD). However, as the lines defining circuits are being reduced in size to the 65 nm and 45 nm scale, one concern is to avoid degrading the current carrying capacity of the copper lines. As the dimensions of copper lines are reduced, electron scattering from the lines becomes significant and causes an increase in resistivity. One solution is to reduce the thickness of the barrier layer and thereby allow for a proportionately thicker copper line within a given trench by using an atomic layer deposited (ALD) barrier layer. A copper seed layer is then applied by a conventional PVD process. However, formation of the copper seed layer is complicated by the need to provide a precise thickness of the layer to avoid overhang at the top of trenches with overly thick layers and to avoid copper oxidation by atmospheric oxygen occurring with overly thin layers.

One proposed solution is to plate copper directly onto a diffusion barrier. Ruthenium, in particular, has shown promise as a diffusion barrier in this application. The insolubility of copper in ruthenium makes ruthenium suitable for use as a diffusion barrier, and the electrical conductivity of ruthenium allows for direct plating of copper onto the ruthenium, which obviates the need for a copper seed layer. Although the possibility of replacing tantalum/tantalum nitride barriers layers with ruthenium remains an attractive possibility, the likely course of development appears to lie with a copper-ruthenium-tantalum/tantalum nitride system.

In order to successfully exploit ruthenium as a barrier layer material, it is necessary to develop suitable chemical-mechanical polishing compositions and methods for the efficient polishing of ruthenium barriers which are compatible with other components of the substrates, and which preferably allow for the simultaneous polishing of one or more of the other substrate components to minimize the total number of processing steps required in substrate manufacture. Polishing compositions that have been developed for ruthenium and other noble metals typically contain strong oxidizing agents, have a low pH, or both, and frequently comprise hard, aggressive abrasives such as alumina. Existing polishing compositions that can effectively planarize substrates comprising ruthenium typically do not effectively planarize the underlying dielectric material of the substrates, thereby requiring use of a second polishing composition to planarize the dielectric material and produce a substrate suitable for further processing.

Thus, there remains a need in the art for improved polishing compositions and methods for chemical-mechanical polishing of substrates comprising ruthenium and dielectric materials.

BRIEF SUMMARY OF THE INVENTION

The invention provides a method of chemically-mechanically polishing a substrate, which method comprises (i) contacting a substrate comprising at least one layer of ruthenium with a polishing pad and a chemical-mechanical polishing composition comprising (a) an abrasive consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å, and (b) water, (ii) moving the polishing pad relative to the substrate, and (iii) abrading at least a portion of the ruthenium to polish the substrate.

DETAILED DESCRIPTION OF THE INVENTION

The invention provides a method of chemically-mechanically polishing a substrate. A substrate is contacted with a polishing pad and a polishing composition comprising, consisting essentially of, or consisting of an abrasive consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å, and water.

The substrate comprises at least one layer of ruthenium. Typically, the substrate further comprises at least one layer of copper, wherein the ruthenium and copper are in contact. The substrate also can optionally further comprise at least one layer of tantalum. When present, the optional at least one tantalum layer can be disposed anywhere on the substrate, but preferably the at least one ruthenium layer is disposed between the at least one tantalum layer and the at least one copper layer. The tantalum layer can comprise tantalum metal or can comprise a suitable tantalum-containing compound, such as tantalum nitride, or a mixture of tantalum metal and a tantalum-containing compound. When the tantalum layer comprises tantalum nitride, the tantalum nitride can comprise a stochiometric tantalum nitride (i.e., TaN) or a nonstochiometric tantalum nitride, for example, $TaN_{0.5}$. The tantalum layer also can comprise a tantalum-containing compound of tantalum with nitrogen and carbon represented by the formula $TaN_xC_y$, wherein $x+y \leq 1$.

Typically, the substrate further comprises an insulating layer. Preferably, the at least one ruthenium layer is disposed between the at least one copper layer and the insulating layer. When present, the at least one tantalum layer is disposed between the at least one ruthenium layer and the insulating layer. The insulating layer can comprise any suitable dielectric material. The insulating layer can be a metal oxide (e.g., silicon dioxide), porous metal oxide, glass, organic polymer, fluorinated organic polymer, or any other suitable insulating layer having a high or low dielectric constant. When the insulating layer comprises a silicon dioxide, the silicon dioxide can be derived from any suitable precursor. Preferably, the silicon dioxide is derived from silane precursors, more preferably from oxidized silane precursors such as tetraethylorthosilicate (TEOS).

The polishing composition comprises an abrasive consisting of particles consisting of titanium dioxide having a rutile structure and particles consisting of titanium dioxide having an anatase structure. Titanium dioxide exists in at least seven polymorphs, of which four exist in nature. The three most common forms of titanium dioxide are rutile, anatase, and brookite, with the rutile and anatase forms being the forms typically obtained via synthesis. All possess the same empirical formula, $TiO_2$, but each has a different crystal structure. The rutile form ("rutile") is the most thermodynamically stable form of titanium dioxide. The crystal structure of rutile is tetragonal in which the Ti—O octahedra share four edges. The anatase form ("anatase") has a tetragonal crystal structure similar to rutile, except that the Ti—O octahedra share four corners instead of four edges. Anatase converts spontaneously into the more stable rutile at temperatures above about 915° C. The brookite form, which is the least common of the three common forms and which is rarely used commercially, has an orthorhombic crystal structure which converts spontaneously into rutile at temperatures around 750° C.

A large number of preparative methods for titanium dioxide are known in the art. Synthetic methods include vapor-phase synthesis and solution-phase synthesis. In vapor-phase synthesis of titanium dioxide, a volatilized titanium (IV) compound is mixed with water vapor and/or oxygen, and the gaseous stream is passed through a heated zone in order to hydrolyze the titanium (IV) compound and produce titanium dioxide. The thus-produced titanium dioxide is isolated by cooling the gaseous stream and collecting particulate titanium dioxide. For example, U.S. Pat. No. 4,842,832 teaches a method of synthesizing titanium dioxide wherein a volatile titanium (IV) compound, such as titanium tetrachloride or a titanium tetraalkoxide compound, is vaporized, the vapors are combined with water vapor and/or oxygen and a carrier gas, and the resulting gaseous mixture is heated in the gas phase to a temperature of 250-600° C. The vapor is then cooled to provide spherical titanium dioxide particles which can be amorphous, rutile, anatase, or a mixture thereof. U.S. Pat. No. 4,241,042 describes a method of synthesizing titanium dioxide wherein a liquid aerosol of a hydrolyzable titanium (IV) compound such as titanium tetrachloride or a titanium tetraalkoxide compound is contacted with water vapor in a carrier gas and heated, optionally in the presence of a nucleating agent. The vapor is subsequently cooled to provide spherical particles of titanium dioxide. The spherical particles can be subjected to a thermal treatment step at 250-1100° C., before or after a recovery step, which thermal treatment step increases the percentage of the spherical titanium dioxide particles which are rutile.

A large number of solution-phase syntheses of titanium dioxide are known in the art. Methods allowing for the preparation of titanium dioxide particles having particular rutile/anatase ratios are well known in the literature. For example, the preparation of titanium dioxide particles via precipitation from solutions of titanium (IV) salts produces mixtures of particles having rutile and anatase forms, with the proportions of rutile and anatase dependent, in part, on the particular titanium (IV) compound used as starting material, as well as on the specific reaction conditions (see, e.g., Wilska, Acta Chemica Scandinavica, 8:1796-1801 (1954)).

The phase content of the titanium dioxide (i.e., the weight ratio of rutile to anatase) can be determined via a number of techniques. One suitable technique is X-ray diffraction (XRD). Rutile and anatase exhibit X-ray diffraction patterns having distinct peaks, both individually as pure crystallites and when present together in a particular sample of titanium dioxide. The ratio of the intensity of the peaks (i.e., lines) in a mixed sample containing both rutile and anatase can be correlated to the concentrations of rutile and anatase via use of calibration curves, obtained by preparing mixtures of rutile and anatase having known amounts of each crystallite and by obtaining an x-ray diffraction thereof. Although the line intensity as a function of concentration is not equal for rutile and for anatase, the determination of the ratio of line intensity for rutile and anatase in a sample containing both is a useful approximation of the weight ratio of rutile and anatase in the sample. See, e.g., Wilska, supra., and references cited therein. Typically, the useful x-ray diffraction line characteristic of rutile has a d-spacing of about 3.24 Å, and the useful x-ray diffraction line characteristic of anatase has a d-spacing of about 3.51 Å.

The x-ray diffraction pattern of the abrasive typically has a ratio of X/Y of about 0.5 or more, wherein X is an intensity of a peak in an x-ray diffraction curve representing a d-spacing of about 3.24 Å and is correlated with the rutile content of the particles, and Y is an intensity of a peak in an x-ray diffraction curve representing a d-spacing of about 3.51 Å and is correlated with the anatase content of the sample. Preferably, the ratio X/Y is greater than or equal to 0.75 (e.g., about 1 or more, or about 1.5 or more, or about 2 or more, or even about 3 or more). In an embodiment, the titanium dioxide particles consist substantially of rutile (i.e., about 95% or more of the particles are rutile), in which case the ratio X/Y tends toward infinity.

Desirably, the abrasive consists of titanium dioxide (i.e., the abrasive is substantially pure titanium dioxide); however, minor amounts of impurities and dopants may be present in the abrasive. In some embodiments, the titanium dioxide is prepared using methods employing dopants such as tin compounds in order to influence the ratio of rutile to anatase in the titanium dioxide. Accordingly, the abrasive in such embodiments may contain small amounts (e.g., about 5 wt. % or less, or about 4 wt. % or less, or about 2 wt. % or less, or about 1 wt. % or less) of materials other than titanium dioxide per se.

The particles of titanium dioxide can have any suitable average particle size (e.g., average particle diameter). The particles of titanium dioxide typically have an average particle size of about 20 nm to about 250 nm. Preferably, the particles of titanium dioxide have an average particle size of about 30 nm to about 200 nm (e.g., about 40 nm to about 150 nm, or about 50 nm to about 125 nm). More preferably, the particles of titanium dioxide have an average particle size of about 50 nm to about 100 nm. In this regard, the average particle size recited herein refers to the average particle size of all titanium dioxide particles present in the polishing composition. Although the average particle sizes of the population of rutile particles and the population of anatase particles present in the polishing composition will typically not be equal, preferably, the average particle sizes of the populations of rutile particles and anatase particles are separately, as well as together, within the ranges recited herein.

Typically, about 0.001 wt. % or more (e.g., about 0.01 wt. % or more) titanium dioxide will be present in the polishing composition. The amount of titanium dioxide in the polishing composition typically will not exceed about 2 wt. %, more typically will not exceed about 1 wt. % (e.g., about 0.5 wt. % or less). Preferably, the amount of titanium dioxide in the polishing composition is about 0.005 wt. % to about 0.5 wt. %, more preferably about 0.01 wt. % to about 0.25 wt. %.

The pH of the polishing composition (i.e., the pH of the water and any components dissolved or suspended therein) can be any suitable value, but typically is about 2 to about 6. Preferably, the pH of the polishing composition is about 3 to about 5. The pH of the polishing composition can be achieved and/or maintained by any suitable means. More specifically, the polishing composition can further comprise a pH adjustor, a pH buffering agent, or a combination thereof. The pH adjustor can be any suitable pH-adjusting compound. For example, the pH adjustor can be any suitable acid strong enough to produce the desired final pH. Examples of suitable acids include nitric acid, acetic acid, phosphoric acid, and the like. The pH can be increased if desired by the addition of a base. Examples of bases include potassium hydroxide, ammonium hydroxide, and tetraalkylammonium hydroxide (e.g., tetramethylammonium hydroxide).

The pH buffering agent can be any suitable buffering agent, for example, phosphates, acetates, borates, ammonium salts, and the like. The polishing composition can comprise any suitable amount of a pH adjustor and/or a pH buffering agent. Such amount desirably is sufficient to achieve and/or maintain the pH of the polishing composition within the ranges set forth herein.

The pH of the polishing composition can be adjusted at any suitable time. For example, the pH can be adjusted during batch formulation of the polishing composition. In still other embodiments, the pH of the polishing composition is adjusted at the point-of-use (e.g., at the surface of the substrate).

In an embodiment, the polishing composition further comprises a cationic copolymer such that the polishing composition comprises, consists essentially of, or consists of (a) an abrasive, as described herein, consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å, (b) a cationic copolymer comprising (A) cationic repeating units comprising quaternary amino groups and (B) nonionic repeating units, and (c) a cationic copolymer, as described herein, comprising (A) cationic repeating units comprising quaternary amino groups and (B) nonionic repeating units, and (c) water. The foregoing descriptions of the polishing composition and its components are equally applicable to this embodiment.

The cationic copolymer comprising (A) cationic repeating units comprising quaternary amino groups and (B) nonionic repeating units (i.e., "cationic copolymer") can comprise any suitable cationic repeating units comprising quaternary amino groups. The quaternary amino groups can be acyclic or can be contained within a cyclic structure. A non-limiting example of a cationic repeating unit providing copolymers comprising cyclic quaternary amino groups is a diallyldimethylamrnonium salt, which repeating unit on polymerization provides quaternized pyrrolidine rings on a polymeric backbone. Non-limiting examples of acyclic cationic repeating units comprising quaternary amino groups include methacryloyloxyethyltrimethylammonium salts or methacryloyloxyethyldimethylbenzylammonium salts. The quaternary ammonium salts can comprise any suitable anions. For example, the quaternary ammonium salts can comprise anions including but not limited to halide (e.g., chloride or bromide), sulfate, hydrogen sulfate, hydroxide, and the like.

The cationic copolymer can comprise any suitable nonionic repeating units. The nonionic repeating units, for example, can be any suitable repeating unit(s), including but not limited to ethylene, propylene, ethylene oxide, propylene oxide, styrene, epichlorohydrin, acrylamide, and mixtures thereof. Preferably, the nonionic repeating unit is acrylamide.

The cationic copolymer can be prepared by any suitable technique. For example, the copolymer can be produced by free radical, cationic, anionic, or condensation polymerization. The copolymer can be a random copolymer, alternating copolymer, periodic copolymer, block copolymer (e.g., AB, ABA, ABC, etc.), graft copolymer, or comb copolymer. The cationic copolymer can be further modified by alkylation, acylation, ethoxylation, or other chemical reaction, in order to alter the solubility, viscosity, or other physical parameter(s) of the copolymer.

The cationic copolymer typically has an average molecular weight of about 5,000 Daltons or more (e.g., about 7,500 Daltons or more, or about 10,000 Daltons or more). Preferably, the cationic copolymer has an average molecular weight of about 50,000 Daltons or less (e.g., about 45,000 Daltons or less, or about 40,000 Daltons or less, or about 35,000 Daltons or less). If the average molecular weight of the cationic copolymer is too low, the cationic copolymer will have little effect on the performance of the polishing composition. If the average molecular weight of the cationic copolymer is too high, the polishing composition may exhibit colloidal instability of the titanium dioxide particles in the polishing composition.

The polishing composition can comprise any suitable amount of the cationic copolymer and when present typically comprises about 10 ppm or more (e.g., about 10 to about 1000 ppm, or about 50 ppm to about 200 ppm). Preferably, the amount of cationic copolymer present in the polishing composition will be about 1000 ppm or less (e.g., about 800 ppm or less, or about 600 ppm or less, or about 400 ppm or less, or even about 200 ppm or less).

When the polishing composition comprises a cationic copolymer, the pH of the polishing composition is preferably about 4 to about 6 and more preferably about 5 to about 6.

In an embodiment, the polishing composition further comprises a peroxide compound such that the polishing composition comprises, consists essentially of, or consists of (a) an abrasive, as described herein, consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å, (b) a peroxide compound, (c) water. The foregoing descriptions of the polishing composition and its components are equally applicable to this embodiment. The peroxide compound is generally characterized as having the formula R—O—O—H wherein R is hydrogen or $C_1$-$C_{10}$ alkyl. Preferably, the peroxide compound is hydrogen peroxide or tert-butyl hydroperoxide. More preferably, the peroxide compound is hydrogen peroxide. When the peroxide compound is present, the polishing composition typically comprises about 0.1 wt. % or more (e.g., about 0.2 wt. % or more, or about 0.5 wt. % or more) of the peroxide compound, based on the total weight of water and any components dissolved or suspended therein. The polishing composition generally comprises about 5 wt. % or less (e.g., about 2 wt. % or less, or about 1 wt. % or less) of the peroxide compound, based on the total weight of water and any components dissolved or suspended therein.

In an embodiment, the polishing composition further comprises a peroxide compound and a cationic copolymer such that the polishing composition comprises, consists essentially of, or consists of (a) an abrasive, as described herein, consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å, (b) a peroxide compound, (c) a cationic copolymer, as described herein, comprising (A) cationic repeating units comprising quaternary amino groups and (B) nonionic repeating units, and (d) water. The foregoing descriptions of the polishing composition and its components are equally applicable to this embodiment.

When the polishing composition comprises a peroxide compound, the polishing composition optionally comprises a corrosion inhibitor (i.e., a film-forming agent). The corrosion inhibitor can be any suitable corrosion inhibitor for any component(s) of the substrate. Preferably, the corrosion inhibitor is a copper-corrosion inhibitor. For the purposes of this invention, a corrosion inhibitor is any compound, or mixture of compounds, that facilitates the formation of a passivation layer (i.e., a dissolution-inhibiting layer) on at least a portion of the surface being polished. Useful corrosion inhibitors include, for example, nitrogen-containing heterocyclic compounds. The corrosion inhibitor desirably comprises one or more 5- or 6-membered, heterocyclic, nitrogen-containing rings. Preferred corrosion inhibitors include 1,2,3-triazole, 1,2,4-triazole, benzotriazole, benzimidazole, benzothiazole, and derivatives thereof, such as, for example, hydroxy-, amino-, imino-, carboxy-, mercapto-, nitro-, urea-, thiourea-, or alkyl-substituted derivatives thereof. Most preferably, the corrosion inhibitor is selected from the group consisting of benzotriazole, 1,2,3-triazole, 1,2,4-triazole, and mixtures thereof. The polishing composition can comprise any suitable amount of the corrosion inhibitor. Generally, when a corrosion inhibitor is present in the polishing composition, the polishing composition comprises about 0.005 wt. % to about 1 wt. % (e.g., about 0.01 to about 0.5 wt. %, or about 0.02 to about 0.2 wt. %) of the corrosion inhibitor.

When the polishing composition further comprises a corrosion inhibitor, the polishing composition comprises, consists essentially of, or consists of (a) an abrasive, as described herein, consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å, (b) a peroxide compound as described herein, (c) a corrosion inhibitor as described herein, and (d) water. The foregoing descriptions of the polishing composition and its components are equally applicable to this embodiment. In another embodiment, the polishing composition comprises, consists essentially of, or consists of (a) an abrasive, as described herein, consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å, (b) a peroxide compound as described herein, (c) a corrosion inhibitor as described herein, (d) a cationic copolymer as described herein, comprising (A) cationic repeating units comprising quaternary amino groups and (B) nonionic repeating units, and (e) water. The foregoing descriptions of the polishing composition and its components are equally applicable to this embodiment.

The polishing composition optionally further comprises one or more other additives. Such additives include any suitable surfactant and/or Theological control agent. Suitable surfactants include, for example, cationic surfactants, anionic surfactants, anionic polyelectrolytes, nonionic surfactants, amphoteric surfactants, fluorinated surfactants, mixtures thereof, and the like.

The polishing composition optionally further comprises an antifoaming agent. The anti-foaming agent can be any suitable anti-foaming agent. Suitable antifoaming agents include, but are not limited to, silicon-based and acetylenic diol-based antifoaming agents. The amount of anti-foaming agent present in the polishing composition typically is about 40 ppm to about 140 ppm.

The polishing composition optionally further comprises a biocide. The biocide can be any suitable biocide, for example an isothiazolinone biocide. The amount of biocide present in the polishing composition typically is about 1 ppm to about 500 ppm, and preferably is about 10 ppm to about 200 ppm.

The polishing composition can be prepared by any suitable technique, many of which are known to those skilled in the art. The polishing composition can be prepared in a batch or continuous process. Generally, the polishing composition can be prepared by combining the components thereof in any order. The term "component" as used herein includes individual ingredients (e.g., abrasive, optional peroxide compound, etc.) as well as any combination of ingredients (e.g., abrasive, optional peroxide compound, optional cationic copolymer, etc.).

The polishing composition also can be provided as a concentrate which is intended to be diluted with an appropriate amount of water prior to use. In such an embodiment, the polishing composition concentrate can comprise, consist essentially of, or consist of an abrasive, optional peroxide compound, optional cationic copolymer, and water in amounts such that, upon dilution of the concentrate with an appropriate amount of water, each component of the polishing composition will be present in the polishing composition in an amount within the appropriate range recited above for each component. For example, the abrasive, optional peroxide compound, and optional cationic copolymer can each be present in the concentrate in an amount that is about 2 times (e.g., about 3 times, about 4 times, or about 5 times) greater than the concentration recited above for each component so that, when the concentrate is diluted with an equal volume of water (e.g., 2 equal volumes water, 3 equal volumes of water, or 4 equal volumes of water, respectively), each component will be present in the polishing composition in an amount within the ranges set forth above for each component. Furthermore, as will be understood by those of ordinary skill in the art, the concentrate can contain an appropriate fraction of the water present in the final polishing composition in order to ensure that the optional peroxide compound, optional cationic copolymer, and other suitable additives are at least partially or fully dissolved in the concentrate.

Any of the components used in conjunction with the invention can be provided in the form of a mixture or solution in water. Two or more components then desirably are individually stored and subsequently mixed to form the polishing composition. In this regard, it is suitable for the polishing composition to be prepared (e.g., for all the components to be mixed together) and then delivered to the surface of the substrate. It is also suitable for the polishing composition to be prepared on the surface of the substrate, through delivery of the components of the polishing composition from two or more distinct sources, whereby the components of the polishing composition meet at the surface of the substrate (e.g., at the point-of-use). In either case, the flow rate at which the components of the polishing composition are delivered to the surface of the substrate (i.e., the delivered amount of the particular components of the polishing composition) can be altered prior to the polishing process and/or during the polishing process, such that the polishing characteristics, such as the polishing rate, of the polishing system is altered.

The polishing composition can be supplied as a one package system comprising, consisting essentially of, or consisting of an abrasive, optional peroxide compound, optional cationic copolymer, and water. Alternatively, the abrasive, optional oxidizing agent, and water can be supplied in a first container, and an optional cationic copolymer can be supplied in a second container, either in dry form, or as a solution or dispersion in water. Optional components, such as a surfactant, pH adjustors, and/or a corrosion inhibitor, can be placed in the first and/or second containers or a third container. Furthermore, the components in the first or second container can be in dry form while the components in the corresponding container can be in the form of an aqueous dispersion or solution. Moreover, it is suitable for the components in the first or second containers to have different pH values, or alternatively to have substantially similar, or even equal, pH values. If an optional component such as a cationic copolymer is a solid, it may be supplied either in dry form or as a mixture in water. The optional oxidizing agent desirably is supplied separately from the other components of the polishing composition and is combined, e.g., by the end-user, with the other components of the polishing composition shortly before use (e.g., 1 week or less prior to use, 1 day or less prior to use, 1 hour or less prior to use, 10 minutes or less prior to use, or 1 minute or less prior to use). Other two-container, or three or more container, combinations of the components of the polishing composition are within the knowledge of one of ordinary skill in the art.

While the components of the polishing composition can be combined well before or even shortly before use, the components of the polishing composition can be combined at or near the point-of-use. As utilized herein, the term "point-of-use" refers to the point at which the polishing composition is contacted with the substrate surface). When the components of the polishing composition are to be combined using point-of-use mixing, the components of the polishing composition are separately stored in two or more storage devices.

In order to mix components of the polishing composition contained in storage devices at or near the point-of-use, the storage devices typically are provided with one or more flow lines leading from each storage device to the point-of-use of the polishing composition (e.g., the platen or the substrate surface). By the term "flow line" is meant a path of flow from an individual storage container to the point-of-use of the component stored therein. The one or more flow lines can each lead directly to the point-of-use, or, in the case that more than one flow line is used, two or more of the flow lines can be combined at any point into a single flow line that leads to the point-of-use. Furthermore, any of the one or more flow lines (e.g., the individual flow lines or a combined flow line) can first lead to one or more of the other devices (e.g., pumping device, measuring device, mixing device, etc.) prior to reaching the point-of-use of the component(s).

The components of the polishing composition can be delivered to the point-of-use independently (e.g., the components are delivered to the substrate surface whereupon the components are mixed during the polishing process), or the components can be combined immediately before delivery to the point-of-use. Components are combined "immediately before delivery to the point-of-use" if they are combined less than 10 seconds prior to reaching the point-of-use, preferably less than 5 seconds prior to reaching the point-of-use, more preferably less than 1 second prior to reaching the point of use, or even simultaneous to the delivery of the components at the point-of-use (e.g., the components are combined at a dispenser). Components also are combined "immediately before delivery to the point-of-use" if they are combined within 5 m of the point-of-use, such as within 1 m of the point-of-use or even within 10 cm of the point-of-use (e.g., within 1 cm of the point of use).

When two or more of the components of the polishing composition are combined prior to reaching the point-of-use, the components can be combined in the flow line and delivered to the point-of-use without the use of a mixing device. Alternatively, one or more of the flow lines can lead into a mixing device to facilitate the combination of two or more of the components. Any suitable mixing device can be used. For example, the mixing device can be a nozzle or jet (e.g., a high pressure nozzle or jet) through which two or more of the components flow. Alternatively, the mixing device can be a container-type mixing device comprising one or more inlets by which two or more components of the polishing composition are introduced to the mixer, and at least one outlet through which the mixed components exit the mixer to be delivered to the point-of-use, either directly or via other elements of the apparatus (e.g., via one or more flow lines). Furthermore, the mixing device can comprise more than one chamber, each chamber having at least one inlet and at least one outlet, wherein two or more components are combined in each chamber. If a container-type mixing device is used, the mixing device preferably comprises a mixing mechanism to further facilitate the combination of the components. Mixing mechanisms are generally known in the art and include stirrers, blenders, agitators, paddled baffles, gas sparger systems, vibrators, etc.

In accordance with the invention, the substrate can be polished with the polishing composition described herein by any suitable technique. The method of the invention is particularly well-suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving the substrate relative to the surface of the polishing pad. The polishing of the substrate takes place by the substrate being placed in contact with the polishing pad, with the polishing composition therebetween, and moving the polishing pad and the polishing composition relative to the substrate, so as to abrade and remove a portion of the substrate contacted with the polishing pad and/or polishing composition to thereby polish at least a portion of the substrate.

A substrate can be planarized or polished with the chemical-mechanical polishing composition with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643. Desirably, the inspection or monitoring of the progress of the polishing process with respect to a workpiece being polished enables the determination of the polishing end-point, i.e., the determination of when to terminate the polishing process with respect to a particular workpiece.

Advantageously, embodiments of the inventive method wherein the polishing composition does not comprise a peroxide compound exhibit useful removal rates for ruthenium and exhibit an approximately 1:1 selectivity for ruthenium and a dielectric material (i.e., ruthenium and the dielectric material are removed at approximately equal rates). Addition of a peroxide compound to the polishing composition increases the ruthenium removal rate relative to the dielectric material removal rate. Addition of a cationic copolymer to the polishing composition increases the removal rate observed for silicon dioxide while having little effect on the removal rate exhibited for ruthenium. Thus, when used to polish substrates further comprising layers of, for example, copper and/or tantalum, whose removal rates can be affected by the presence or absence of an oxidizing agent, the inventive method allows for tailoring of relative removal rates of the various substrate materials by adjusting the components of the polishing composition.

Applicants have unexpectedly discovered a difference in polishing mechanisms with titanium dioxide wherein the x-ray diffraction pattern of the particles has a ratio of X/Y of about 0.5 or more, wherein X and Y are as described herein, depending on the pH of the polishing composition. For example, at a pH of 9.5, the ruthenium removal rate depends on the amount of titanium dioxide present in the polishing composition (i.e., the ruthenium removal rate increases with increasing amounts of titanium dioxide), whereas at a pH of 4, above a threshold amount of titanium dioxide of less than about 100 ppm, the ruthenium removal rate is less dependent of the amount of titanium dioxide in the polishing composition. In addition, at a pH of 9.5, the ruthenium removal rate exhibits a greater dependence on polishing downforce than at a pH of 4.

While not wishing to be bound by any particular theory, it is believe that the titanium dioxide interacts chemically with the surface of the ruthenium layer to form a ruthenium-titanium species. Thus, although there may be some contribution to the ruthenium removal rate by the abrasive action of the titanium dioxide, the enhanced removal rate exhibited by the inventive polishing method is due at least to some extent to chemical reaction of the titanium dioxide, more specifically with the rutile form of the titanium dioxide, with ruthenium. The titanium dioxide is regarded to act as a chemical reagent in addition to its possible role as an abrasive material. Without wishing to be bound by any particular theory, it is noted that the rutile form of titanium dioxide has a greater ratio of Lewis acid sites to Lewis base sites than the anatase form, which may account for the observation that above a ratio of rutile/anatase such that the x-ray diffraction pattern of the particles has a ratio of X/Y of approximately 0.5, the ruthenium removal rate is dramatically enhanced.

The following examples further illustrate the invention but, of course, should not be construed as in any way limiting its scope.

In the examples below, the polishing experiments generally involved the use of 21.4 kPa (3.1 psi) downforce pressure of the substrate against the polishing pad, 90 rpm platen speed, 93 rpm carrier speed, 180 mL/min polishing composition flow rate, and in-situ conditioning of a concentric grooved CMP pad.

EXAMPLE 1

This example shows the effect of the rutile/anatase ratio of titanium dioxide in a polishing composition on ruthenium removal rates.

Similar substrates comprising ruthenium were polished with nine different polishing compositions (Compositions 1A-1I) comprising titanium dioxide in water at a pH of 4. The samples of titanium dioxide used in the compositions were characterized using x-ray diffraction by measurement of the values of X and Y for each sample, wherein X is the intensity of a peak in an x-ray diffraction curve representing a d-spacing of about 3.24 Å, and Y is the intensity of a peak in an x-ray diffraction curve representing a d-spacing of about 3.51 Å for each of the samples. Compositions 1A-1C (comparative) each contained 0.1 wt. % titanium dioxide having a ratio of X/Y of approximately zero. Compositions 1D-1F (comparative) each contained titanium dioxide having a ratio of X/Y of approximately 0.33. Compositions 1G-1I (invention) each contained titanium dioxide having a ratio of X/Y of approximately 1. Compositions 1A (comparative), 1D (comparative), and 1G (invention) contained no hydrogen peroxide. Compositions 1B (comparative), 1E (comparative), and 1H (invention) further contained 0.1 wt. % hydrogen peroxide. Compositions 1C (comparative), 1F (comparative), and 1I (invention) further contained 1 wt. % hydrogen peroxide.

After polishing, the ruthenium removal rates ("Ru RR") were determined. The results are set forth in Table 1.

TABLE 1

| Polishing Composition | X/Y Ratio | Wt. % $H_2O_2$ | Ru RR (Å/min) |
| --- | --- | --- | --- |
| 1A (comparative) | 0 | 0 | 10 |
| 1B (comparative) | 0 | 0.1 | 8 |
| 1C (comparative) | 0 | 1 | 64 |
| 1D (comparative) | 0.33 | 0 | 72 |
| 1E (comparative) | 0.33 | 0.1 | 68 |
| 1F (comparative) | 0.33 | 1 | 91 |
| 1G (invention) | 3 | 0 | 260 |
| 1H (invention) | 3 | 0.1 | 370 |
| 1I (invention) | 3 | 1 | 400 |

As is apparent from the results set forth in Table 1, polishing compositions comprising titanium dioxide having a ratio of X/Y of 3 exhibit significantly higher ruthenium removal rates, ranging from 3.6 to 46 times faster than polishing compositions comprising titanium dioxide having a ratio of X/Y less than 0.5. The inventive polishing compositions comprising titania having a ratio of X/Y of 3 and not further comprising a peroxide compound exhibited an approximately 3.6 times greater removal rate than a comparative polishing composition having a ratio of X/Y of 0.33.

EXAMPLE 2

This example shows the effect of the amount of titanium dioxide having rutile/anatase ratios of greater than 0.5 in polishing compositions on the polishing of ruthenium at a pH of about 4 and at a pH of about 9.5.

Similar substrates comprising ruthenium were polished with eight different polishing compositions (Compositions 2A-2H). The samples of titanium dioxide used in the compositions were characterized using x-ray diffraction by measurement of the values of X and Y for each sample, wherein X is the intensity of a peak in an x-ray diffraction curve representing a d-spacing of about 3.24 Å, and Y is the intensity of a peak in an x-ray diffraction curve representing a d-spacing of about 3.51 Å for each of the samples. Compositions 2A-2D comprised varying amounts of a titanium dioxide ("$TiO_2$") having a ratio of X/Y of about 0.88, at a pH of about 4. Compositions 2E-2H comprised varying amounts of a titanium dioxide having a ratio of X/Y of about 1.07, at a pH of about 9.5. None of Compositions 2A-2H comprised added peroxide compound.

Following use of the polishing compositions, the ruthenium removal rates ("Ru RR") were determined. The results are set forth in Table 2.

TABLE 2

| Composition | pH | $TiO_2$ (wt. %) | Ru RR (Å/min) |
| --- | --- | --- | --- |
| 2A | 4 | 0.01 (100 ppm) | 300 |
| 2B | 4 | 0.1 | 440 |
| 2C | 4 | 1 | 420 |
| 2D | 4 | 3 | 500 |
| 2E | 9.5 | 0.01 (100 ppm) | not observable |
| 2F | 9.5 | 0.1 | 50 |
| 2G | 9.5 | 1 | 650 |
| 2H | 9.5 | 3 | 850 |

As is apparent from the results set forth in Table 2, polishing compositions comprising titanium dioxide having a ratio of X/Y greater than 0.5 and having a pH of about 4 exhibited an increase in the ruthenium removal rate of approximately 1.7 times when the amount of titanium dioxide was increased from 0.01 wt. % to 3 wt. % in the polishing composition. Composition 1A, comprising 0.01 wt. % (i.e., 100 ppm) titanium dioxide, exhibited an appreciable ruthenium removal rate of about 300 Å/min. Polishing compositions comprising titanium dioxide having a ratio of X/Y of greater than 0.5 and having a pH of about 9.5 exhibited an increase in the observed ruthenium removal rate from approximately zero to approximately 850 Å/min on increasing the amount of titanium dioxide from 0.01 wt. % to 3 wt. % in the polishing composition.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of chemically-mechanically polishing a substrate, which method comprises:
    (i) contacting a substrate comprising at least one layer of ruthenium with a polishing pad and a chemical-mechanical polishing composition comprising:
        (a) an abrasive consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å, and
        (b) water,
    (ii) moving the polishing pad and the polishing composition relative to the substrate, and
    (iii) abrading at least a portion of the ruthenium to polish the substrate.

2. The method of claim 1, wherein the polishing composition comprises about 0.001 wt. % to about 1 wt. % of the abrasive.

3. The method of claim 1, wherein the pH of the water and any components dissolved or suspended therein is about 2 to about 6.

4. The method of claim 1, wherein the particles have an average particle size of about 50 nm to about 100 nm.

5. The method of claim 1, wherein the polishing composition further comprises a cationic copolymer comprising (A) cationic repeating units comprising quaternary amino groups and (B) nonionic repeating units.

6. The method of claim 1, wherein the substrate further comprises at least one layer of silicon dioxide, and at least a portion of the silicon dioxide is abraded to polish the substrate.

7. The method of claim 6, wherein a selectivity for polishing ruthenium as compared to silicon dioxide is about 0.5 to about 2.

8. The method of claim 1, wherein the substrate further comprises at least one layer of copper, and at least a portion of the copper is abraded to polish the substrate.

9. The method of claim 1, wherein the polishing composition further comprises a peroxide compound.

10. The method of claim 9, wherein the peroxide compound is hydrogen peroxide.

11. The method of claim 9, wherein the substrate further comprises at least one layer of silicon dioxide, and at least a portion of the silicon dioxide is abraded to polish the substrate.

12. The method of claim 11, wherein a selectivity for polishing ruthenium as compared to silicon dioxide is about 2 or more.

13. The method of claim 9, wherein the polishing composition further comprises a cationic copolymer comprising (A) cationic repeating units comprising quaternary amino groups and (B) nonionic repeating units.

14. The method of claim 13, wherein a selectivity for polishing ruthenium as compared to silicon dioxide is about 2 or less.

15. The method of claim 9, wherein the substrate further comprises at least one layer of copper, and at least a portion of the copper is abraded to polish the substrate.

16. The method of claim 1, wherein the chemical-mechanical polishing composition consists essentially of:
    (a) about 0.001 wt. % to about 1 wt. % of an abrasive consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å, and
    (b) water,
wherein the particles have an average particle size of about 50 nm to about 100 nm, and wherein the pH of the water and any components dissolved or suspended therein is about 2 to about 6.

17. The method of claim 16, wherein the substrate further comprises at least one layer of copper, and at least a portion of the copper is abraded to polish the substrate.

18. The method of claim 1, wherein the chemical-mechanical polishing composition consists essentially of:
    (a) about 0.001 wt. % to about 1 wt. % of an abrasive consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å,
    (b) a peroxide compound, and
    (c) water,
wherein the particles have an average particle size of about 50 nm to about 100 nm, and wherein the pH of the water and any components dissolved or suspended therein is about 2 to about 6.

19. The method of claim 18, wherein the substrate further comprises at least one layer of copper, and at least a portion of the copper is abraded to polish the substrate.

20. The method of claim 1, wherein the chemical-mechanical polishing composition consists essentially of:
    (a) about 0.001 wt. % to about 1 wt. % of an abrasive consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å,
    (b) a peroxide compound,
    (c) a cationic copolymer comprising (A) cationic repeating units comprising quaternary amino groups and (B) nonionic repeating units, and
    (d) water,
wherein the particles have an average particle size of about 50 nm to about 100 nm, and wherein the pH of the water and any components dissolved or suspended therein is about 2 to about 6.

21. The method of claim 20, wherein the substrate further comprises at least one layer of copper, and at least a portion of the copper is abraded to polish the substrate.

22. The method of claim 1, wherein the chemical-mechanical polishing composition consists essentially of:
    (a) about 0.001 wt. % to about 1 wt. % of an abrasive consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å, (b) a peroxide compound,
(c) a corrosion inhibitor, and
(d) water, wherein the particles have an average particle size of about 50 nm to about 100 nm, and wherein the pH of the water and any components dissolved or suspended therein is about 2 to about 6.

23. The method of claim 1, wherein the chemical-mechanical polishing composition consists essentially of:

(a) about 0.001 wt. % to about 1 wt. % of an abrasive consisting of (A) particles consisting of titanium dioxide having a rutile structure and (B) particles consisting of titanium dioxide having an anatase structure, wherein an x-ray diffraction pattern of the particles has a ratio of X/Y of about 0.5 or more, wherein X is an intensity of a peak in an x-ray diffraction curve representing a d-spacing of about 3.24 Å, and Y is an intensity of a peak in an x-ray diffraction curve representing a d-spacing of about 3.51 Å, (b) a peroxide compound,
(c) a cationic copolymer comprising (A) cationic repeating units comprising quaternary amino groups and (B) nonionic repeating units,
(d) a corrosion inhibitor, and
(e) water, wherein the particles have an average particle size of about 50 nm to about 100 nm, and wherein the pH of the water and any components dissolved or suspended therein is about 2 to about 6.

* * * * *